WILLIAM PARSONS.
Improvement in Bale Ties.
No. 122,907.        Patented Jan. 23, 1872.
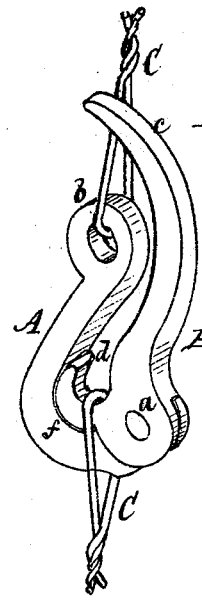
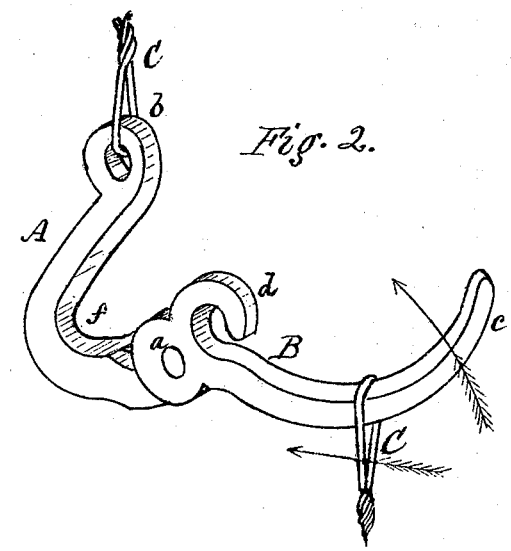
Witnesses.
Arch.d Baine
Wm Baine
Inventor.
William Parsons,
pr Burke Fraser & Osgood,
Atty's.

123,907

UNITED STATES PATENT OFFICE.

WILLIAM PARSONS, OF PALMYRA, NEW YORK.

IMPROVEMENT IN BALE-TIES.

Specification forming part of Letters Patent No. 122,907, dated January 23, 1872.

Specification describing a certain Improvement in Bale-Ties, invented by WILLIAM PARSONS, of Palmyra, in the county of Wayne and State of New York.

My invention consists of two hook-arms, folding one within the other, and receiving the reverse ends of the binding-wire in the manner and for the purpose hereinafter specified.

In the drawing, Figure 1 is a perspective view of the tie closed, and with the ends of the binding-wire in place; Fig. 2, a similar view of the same open and in the act of closing.

A B represent the hook-arms, which are pivoted together at $a$. The arm A is simply a pendant, which has a hook or eye, $b$, at its upper end for receiving the upper end of the binding-wire C. The arm B is in the form of a lever, the long end $c$ being of curved form, so that when turned up, as in Fig. 1, it will prevent the unfastening of the device by not catching or coming in contact with any object in turning or moving the bale. Its lower end is formed into an open hook, $d$, which, when closed, shuts into a seat or bend, $f$, of the arm A, fitting closely therein, and coming in a vertical line, or nearly so, with the eye $b$. This hook receives the lower end of the binding-wire.

The operation is as follows: The upper end of the binding-wire is secured to hook or eye $b$. It is then passed around the bale and the loop of the reverse end is passed over the end of lever $c$, as shown in Fig. 1. The lever is then raised, and the loop will slip thereon into hook $d$. In passing over the pivot a strain or tension is produced on the wire by the eccentric action, which tightens it on the bale, and when in place with the two ends of the binding in line, as in Fig. 1, the tension will cause hook $d$ to rest firm in its seat $f$, and there will be no danger of disconnection or unfastening, as the wire is non-elastic and will not yield.

This tie is effective in baling hay, cotton, rags, &c., as it can be attached and detached at pleasure, and when closed is of such form that it will not catch in surrounding objects.

It will be noticed that the device slants both ways upward, and is rounding on the bottom, and presents no sharp points for contact. It also combines the features of a double attachment for the ends of the wire, in a vertical line with each other, and an eccentric lever, which produces tension on the wire in the act of locking. It will, therefore, produce a binding strain on the wire, and will snap itself in place and become self-holding. This tension of the wire always holds the hook $d$ firm in seat $f$, and releases the lever in its upright position. The whole is made of malleable cast-iron, and is very cheap.

Having thus described my invention, what I claim as new, and desire to secure by Letters Patent, is—

The hook A, formed with the curved seat $f$, pivoted to and in combination with the eccentric lever B, having the curved open hook $d$, all constructed, arranged, and operating in connection with the band C, in the manner described.

In testimony whereof I have hereunto signed my name in the presence of two subscribing witnesses.

WILLIAM PARSONS.

Witnesses:
   R. F. OSGOOD,
   ARCHIE BAINE.